(12) United States Patent
Chen et al.

(10) Patent No.: US 11,461,301 B2
(45) Date of Patent: Oct. 4, 2022

(54) DATABASE INDEX OPTIMIZATION

(71) Applicant: International Business Machines Corporation, Armonk, NY (US)

(72) Inventors: Fang Chen, Beijing (CN); Xiaobo Wang, Beijing (CN); Shuo Li, Beijing (CN); ShengYan Sun, Beijing (CN); Hong Mei Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 13 days.

(21) Appl. No.: 17/019,286

(22) Filed: Sep. 13, 2020

(65) Prior Publication Data
US 2022/0083525 A1    Mar. 17, 2022

(51) Int. Cl.
*G06F 16/00* (2019.01)
*G06F 16/22* (2019.01)
*G06F 16/17* (2019.01)
*G06F 16/21* (2019.01)
*G06F 16/25* (2019.01)

(52) U.S. Cl.
CPC ...... *G06F 16/2272* (2019.01); *G06F 16/1727* (2019.01); *G06F 16/217* (2019.01); *G06F 16/258* (2019.01)

(58) Field of Classification Search
CPC .......... G06F 16/2272; G06F 16/1727
See application file for complete search history.

(56) References Cited

U.S. PATENT DOCUMENTS

| | | | |
|---|---|---|---|
| 7,361,174 B2* | 4/2008 | Bee | A61B 18/1477 606/41 |
| 8,019,769 B2* | 9/2011 | Rolle | G06F 40/289 707/755 |
| 9,342,466 B2* | 5/2016 | Shapiro | G06F 21/00 |
| 10,354,088 B2* | 7/2019 | Zheng | G06F 16/24575 |
| 10,452,297 B1 | 10/2019 | Karr et al. | |
| 10,540,250 B2 | 1/2020 | Mola | |
| 10,838,919 B2* | 11/2020 | Botner | G06F 16/258 |
| 11,196,542 B2* | 12/2021 | Natarajan | H04L 9/3239 |
| 11,334,439 B2* | 5/2022 | Natarajan | G06F 11/1451 |
| 2008/0140604 A1* | 6/2008 | Collier | G06F 16/24534 |
| 2009/0276449 A1* | 11/2009 | Syed | G06F 16/2453 |
| 2015/0356128 A1* | 12/2015 | Nishimura | G06F 16/2237 707/745 |
| 2016/0154890 A1* | 6/2016 | Nishimura | G06F 16/283 707/770 |
| 2017/0139596 A1 | 5/2017 | Hack et al. | |

(Continued)

FOREIGN PATENT DOCUMENTS

| | | |
|---|---|---|
| CN | 104657432 A | 5/2015 |
| CN | 105426490 B | 3/2016 |
| CN | 107644070 A | 1/2018 |

*Primary Examiner* — Jean M Corrielus
(74) *Attorney, Agent, or Firm* — Stephanie L. Carusillo

(57) ABSTRACT

In an approach for database index optimization, a processor detects a pattern of characters and numeric digits of an index key. The index key provides an access to a database through an index access without a sorting operation. A processor determines a converting format based on the pattern of the index key. The pattern includes a string of the numeric digits. A processor converts the index key into a converted key by converting the string of the numeric digits into an integer. A processor saves the converted key into a storage.

9 Claims, 7 Drawing Sheets

(56) References Cited

U.S. PATENT DOCUMENTS

| | | | |
|---|---|---|---|
| 2017/0177636 A1* | 6/2017 | Nguyen | G06F 16/2477 |
| 2017/0364921 A1* | 12/2017 | Scribner | G06F 16/9535 |
| 2019/0042620 A1* | 2/2019 | Garagiola | G06F 16/2453 |
| 2019/0095490 A1 | 3/2019 | Colgrove et al. | |
| 2019/0155806 A1 | 5/2019 | Mathew et al. | |

* cited by examiner

DATABASE INDEX OPTIMIZATION

BACKGROUND

The present disclosure relates generally to the field of database management, and more particularly to database index optimization.

A database may be an organized collection of data, generally stored and accessed electronically from a computer system. Where databases are more complex, databases are often developed using formal design and modeling techniques. A database management system is the software that interacts with end users, applications, and the database itself to capture and analyze the data. A database management system may additionally encompass core facilities provided to administer a database. The term database may be used to loosely refer to any of the database management system, the database system or an application associated with the database.

SUMMARY

Aspects of an embodiment of the present disclosure disclose an approach for database index optimization. A processor detects a pattern of characters and numeric digits of an index key. The index key provides an access to a database through an index access without a sorting operation. A processor determines a converting format based on the pattern of the index key. The pattern includes a string of the numeric digits. A processor converts the index key into a converted key by converting the string of the numeric digits into an integer. A processor saves the converted key into a storage.

DETAILED DESCRIPTION

Figure 1:
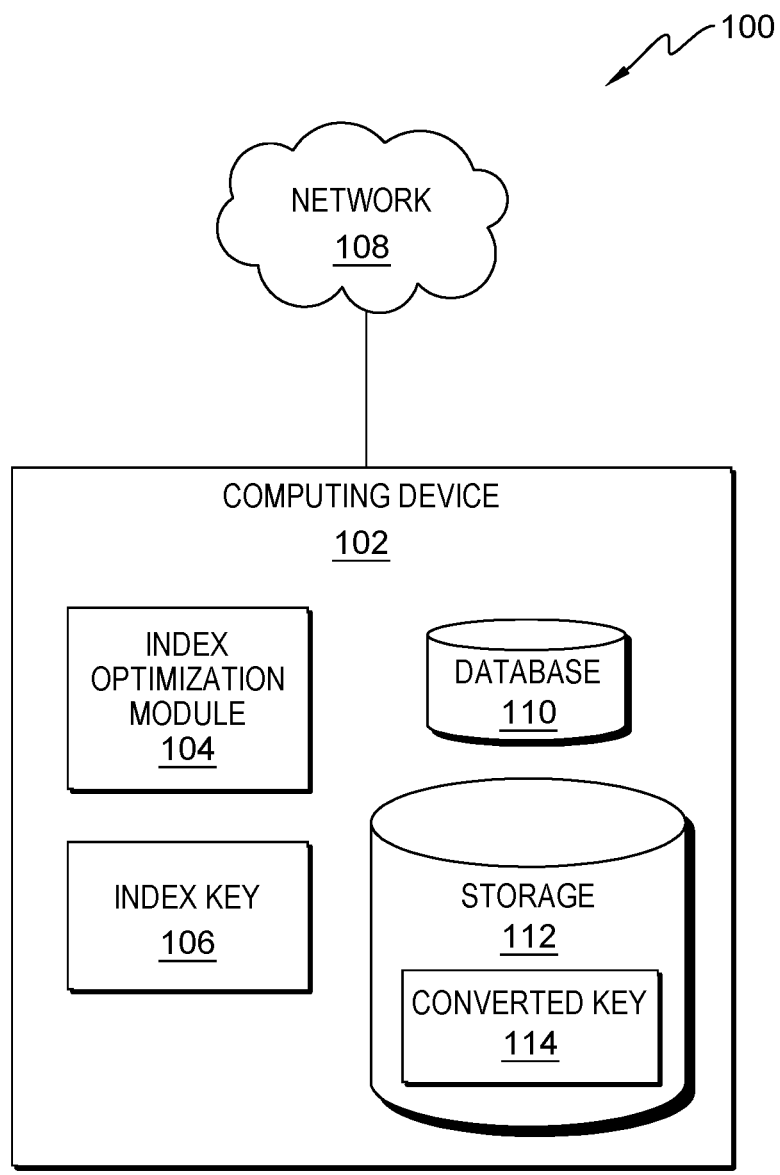
FIG. 1 is a functional block diagram illustrating a database index optimization environment, in accordance with an embodiment of the present disclosure.

The present disclosure is directed to systems and methods for database index optimization.

A database index can provide high efficiency access to data. Furthermore, index order can avoid a sorting operation and may improve other operations such as ordering and grouping in a database. Embodiments of the present disclosure recognize that database index keys can occupy additional disk space and index maintenance is time consuming.

Embodiments of the present disclosure recognize a need for converting a long index key to a short index key to save storage space. In an example, an index key can be defined with a char type where some values in the index key are numeric digits. Embodiments of the present disclosure introduce a method to optimize an index key with the char type to save storage space.

Embodiments of the present disclosure disclose detecting index key value patterns. Embodiments of the present disclosure disclose identifying frequent patterns and building multiple internal index key formats. Embodiments of the present disclosure also disclose converting an existing and incoming key value from a string type to a numeric type. Embodiments of the present disclosure also disclose converting an index key back from an internal format to an external format when a key format for comparison between two index keys is not compatible with the internal format. Embodiments of the present disclosure also disclose converting an index key back from an internal format to an external format when an index only access is supported.

Embodiments of the present disclosure optimize index keys and reduce storage space that index keys occupy. Embodiments of the present disclosure access the data from an index directly and order the retrieved data without a sort operation. Embodiments of the present disclosure improve performance of an index access by decreasing index capacity and reducing the number of synchronous input/output operations.

In general, a character is any letter, number, space, punctuation mark, or symbol. The two terms "char" and "character" are used interchangeably hereby. Each character may require one byte of space. In an example, a list of characters that can be typed is defined by the ASCII and extended ASCII set. Numbers are strings of digits used to indicate magnitude. Numeric may be anything of, relating to, or containing numbers. The numbering system may include ten different digits: 0, 1, 2, 3, 4, 5, 6, 7, 8, and 9. If a value is an alphanumeric, it may contain letters and numbers. A numeric digit is a single symbol (such as "2" or "5") used alone, or in combinations (such as "25"), to represent numbers (such as the number 25) according to some positional numeral systems. For a given numeral system with an integer base, the number of digits required to express arbitrary numbers is given by the absolute value of the base. For example, the decimal system (base 10) requires ten digits (0 through to 9), whereas the binary system (base 2) has two digits (e.g.: 0 and 1).

Each digit in a number system may represent an integer. For example, in decimal the digit "1" represents the integer one, and in the hexadecimal system, the letter "A" represents the number ten. A positional number system has one unique digit for each integer from zero up to, but not including, the radix of the number system. In the positional decimal system, the numbers 0 to 9 can be expressed using their respective numerals "0" to "9" in the rightmost "units" position. The number 12 can be expressed with the numeral "2" in the units position, and with the numeral "1" in the "tens" position, to the left of the "2" while the number 312 can be expressed by three numerals: "3" in the "hundreds" position, "1" in the "tens" position, and "2" in the "units" position.

The binary (base 2), octal (base 8), and hexadecimal (base 16) systems, extensively used in computer science, follow the conventions of the Hindu-Arabic numeral system. The binary system uses only the digits "0" and "1", while the octal system uses the digits from "0" through "7". The hexadecimal system uses all the digits from the decimal system, plus the letters "A" through "F", which represent the numbers 10 to 15 respectively.

Integer data types may hold numbers that are whole, or without a decimal point. For example, integer data types may include a small integer type, an integer type, a big integer type or other suitable integer types. The difference between these types is the size of the number that the integer data types can store.

A string is a data type used in programming, such as an integer and floating point unit, but is used to represent text rather than numbers. A string may be comprised of a set of characters that can also contain spaces and numbers. Even "12345" could be considered a string, if specified correctly. A string may be generally considered as a data type and may be implemented as an array data structure of bytes (or words) that stores a sequence of elements, typically characters, using some character encoding. A char data type may be a data type with the size of exactly one byte, which in turn is defined to be large enough to contain any member of a basic execution character set. A common example size for a char type is 8 bits.

The present disclosure will now be described in detail with reference to the Figures. FIG. 1 is a functional block diagram illustrating a database index optimization environment, generally designated 100, in accordance with an embodiment of the present disclosure.

In the depicted embodiment, database index optimization environment 100 includes computing device 102 and network 108. Computing device 102 includes index optimization module 104, index key 106, database 110, and storage 112.

In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to index optimization module 104, index key 106, database 110, storage 112, and network 108 and is capable of processing program instructions and executing index optimization module 104, in accordance with an embodiment of the present disclosure. Computing device 102 may include internal and external hardware components, as depicted and described in further detail with respect to FIG. 10.

Further, in the depicted embodiment, computing device 102 includes index optimization module 104, index key 106, database 110, and storage 112. In the depicted embodiment, index optimization module 104, index key 106, database 110, and storage 112 are located on computing device 102. However, in other embodiments, index optimization module 104, index key 106, database 110, and storage 112 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and index optimization module 104, index key 106, database 110, and storage 112, in accordance with a desired embodiment of the disclosure.

Database 110 may be an organized collection of data, generally stored and accessed electronically from computing device 102. Index key 106 can provide an efficient access to database 110 through an index access without a sorting operation. In an example, index key 106 is illustrated to be one index key to provide an access to database 110. In another example, index key 106 is multiple index keys to provide an access to database 110 without a sorting operation. Index key 106 may be defined as a character (char) type. Index key 106 may include one or more characters. For example, a character in index key 106 may be a digit or non-digit character. A digit character may be a numeric digit, for example from 0 to 9. A numeric digit is a single symbol (such as "2" or "5") used alone, or in combinations (such as "25"), to represent numbers (such as the number 25) according to some positional numeral systems. For a given numeral system with an integer base, the number of digits required to express arbitrary numbers is given by the absolute value of the base. For example, the decimal system (base 10) requires ten digits (0 through to 9), whereas the binary system (base 2) has two digits (e.g.: 0 and 1).

A non-digit character may be any letter, space, punctuation mark, or symbol. In an example, the list of characters that can be typed is defined by the ASCII and extended ASCII set. Each character may require one byte of space. For example, if index key 106 has eight characters, index key 106 may takes up 8 bytes. Each non-digital character in index key 106 may require one byte of space. Each numeric digit in index key 106 may also require one byte of space as index key is defined as a char type. Index key 106 is depicted with some examples and is described in further detail with respect to FIGS. 2A-4.

In one or more embodiments, index optimization module 104 is configured to detect a pattern of characters and numeric digits of index key 106. The pattern of index key 106 may include how many numeric digits and how many non-digit characters in index key 106. The pattern of index key 106 may also include how the numeric digits and the non-digit characters are positioned in index key 106. In an example, the numeric digits can be all positioned together in a part in index key 106. In another example, the non-digit characters can be all positioned together in a part in index key 106. In another example, the numeric digits can be positioned in multiple parts of index key 106. In yet another example, the non-digit characters can be positioned in multiple parts of index key 106.

In one or more embodiments, index optimization module 104 is configured to determine a converting format of index key 106 based on the pattern of index key 106. A converting format means a format that index optimization module 104 may convert the numeric digits from a char type into an integral data type based on the pattern of index key 106. An integer is a number that can be written without a fractional component. Generally, an integer may be a datum of integral data type that represents some range of mathematical integers. Integral data types may be of different sizes and may or may not be allowed to contain negative values. Integers may be commonly represented as a group of binary digits (bits). In an example, an integral data type may store whole numbers that range, for example, from 0 to 4,294,967,295 for 10 digits of precision. An integral data type may require 4 bytes of storage per value. A byte generally has eight bits. In another example, an integral data type may be a small integer type, an integer type, or a big integer type. The difference between these types is the size of the number that they can store. In an example, a small integer type may require 2 bytes of storage per value. The small integer type may store whole numbers that range, from example, from 0 to 65,535 for 5 digits of precision. An integer type may require 4 bytes of storage per value. The integer type may store whole numbers that range, for example, from 0 to 4,294,967,295 for 10 digits of precision. A big integer type may require 8 bytes of storage per value. The big integer type may store whole numbers that range, for example, from 0 to 18,446,744,073,709,551,615 for 20 digits of precision. An integral data type can be in other suitable format to hold integers.

In one or more embodiments, index optimization module 104 is configured to convert a string of numeric digits into an integer in index key 106. As discussed above, each numeric digit in index key 106 may require one byte of space as index key 106 is defined as a char type. An integer type may require 4 bytes of storage per value. The integer type may store whole numbers that range, for example, from 0 to 4,294,967,295 for 10 digits of precision. In an example, index key 106 may include two parts—a first part is numeric digits and a second part is non-digit characters. Index optimization module 104 may convert the numeric digits of the entire first part into an integral data type as one integer. Index optimization module 104 may keep the second part of non-digit characters as the same as a char type. Alternatively, index optimization module 104 may convert the numeric digits of the entire first part as multiple integers. In another example, index key 106 may include multiple parts of numeric digits in different positions of index key 106. Index optimization module 104 may convert each part of the numeric digits into an integral data type as an integer for each part. The integral data type can be a small integer type, an integer type, a big integer type, or other suitable integer types. The difference between these integral data types is the size of the number that they can store. In an example, a small integer type may require 2 bytes of storage that can store whole numbers that range from 0 to 65,535. An integer type may require 4 bytes of storage that can store whole numbers that range from 0 to 4,294,967,295. A big integer type may require 8 bytes of storage that may store whole numbers that range from 0 to 18,446,744,073,709,551,615. Converting numeric digits into integers in index key 106 is depicted with some examples and described in further detail with respect to FIGS. 2A-4.

In one or more embodiments, index optimization module 104 is configured to save converted key 114 into storage 112. In an example, converted key 114 is illustrated to be one converted key converted from one index key 106. In another example, converted key 114 is multiple converted keys that are converted from multiple index keys 106. Converted key 114 may include integers that have been converted from numeric digits of index key 106. Converted key 114 may also include non-digit characters in index key 106. Because an integer would generally require less space than a string of numeric digits, converted key 114 would need less space than index key 106.

In one or more embodiments, index optimization module 104 is configured to preserve the order of index access to database 110 after index key 106 is converted into converted key 114. The order of index is kept as the same in index key 106 and converted key 114. There is no need for additional transformation for a key comparison. For example, a first index key has a string "3241" which has a hexadecimal value of "F3F2F4F1" and requires 4 bytes of space. Index optimization module 104 may convert string "3241" into integer 3142. The first index key is converted into a first converted key with a hexadecimal value of "0CA5" which requires only 2 bytes of space. A second index key has a string "1234" which has a hexadecimal value of "F1F2F3F4" and requires 4 bytes of space. Index optimization module 104 may convert string "1234" into integer 1234. The second index key is converted into a second converted key with a hexadecimal value of "04D2" which requires only 2 bytes of space. When the two index keys are used to access database 110, the order to search database 110 is that the first index key is greater than the second index key because "F3F2F4F1" is greater than "F1F2F3F4". After conversion from the two index keys into the two converted keys, the order to search database 110 with the two converted keys is still same as the order with the two index keys. The first converted key is still greater than the second converted key as integer 3241 in the hexadecimal value of "0CA5" is also greater than integer 1234 in the hexadecimal value of "04D2". The search order of the two index keys are preserved after the two index keys are converted into the two converted keys from the strings to the integers. The two converted keys save storage space while preserving the search order of the two index keys to access database 110. The order preservation is depicted with an example and described in further detail with respect to FIG. 5.

In the depicted embodiment, storage 112 is computer readable storage media. Converted key 114 is saved in storage 112. In other embodiments, converted key 114 can be saved in other suitable storage. In the depicted embodiment, converted key 114 is located in storage 112. However, in other embodiments, converted key 114 can be located externally and accessed through a communication network such as network 108. In some embodiments, storage 112 may be random access memory (RAM). Storage 112 can include any suitable volatile or non-volatile computer readable storage media. Storage 112 can be a fast memory that enhances the performance of computer processor(s) by holding recently accessed data, and data near accessed data. In another example, storage 112 may include a magnetic hard disk drive. Alternatively, or in addition to a magnetic hard disk drive, storage 112 can include a solid state hard drive, a semiconductor storage device, read-only memory (ROM), erasable programmable read-only memory (EPROM), flash memory, or any other computer readable storage media that is capable of storing program instructions or digital information. Storage 112 may also be removable. For example, a removable hard drive may be used for storage 112. Other examples include optical and magnetic disks, thumb drives, and smart cards that are inserted into a drive for transfer onto another computer readable storage medium that is also part of storage 112.

Figure 2A:
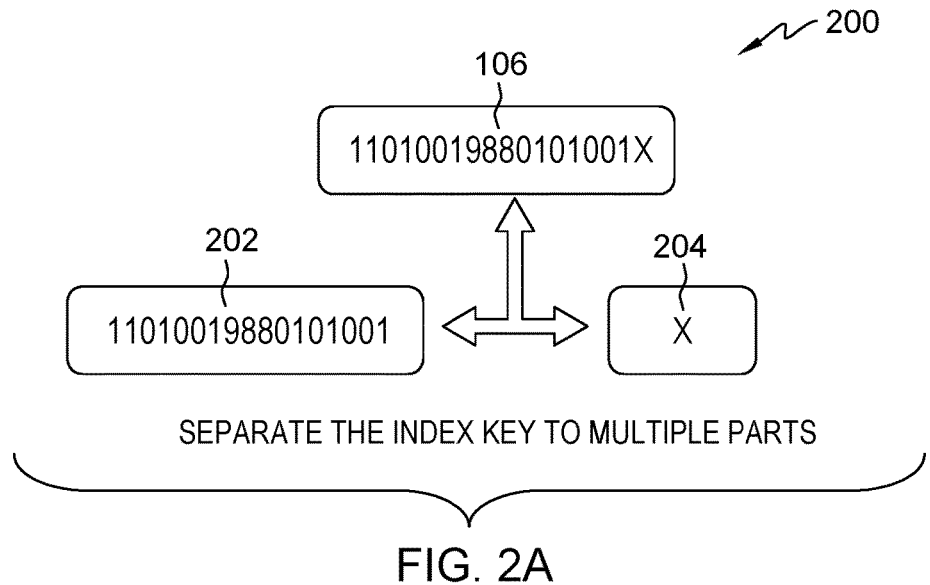
FIGS. 2A and 2B illustrate an example of an index key with an example pattern of numeric digits and non-digit characters in the index key of a computing device in FIG. 1, in accordance with an embodiment of the present disclosure.
Figure 2B:
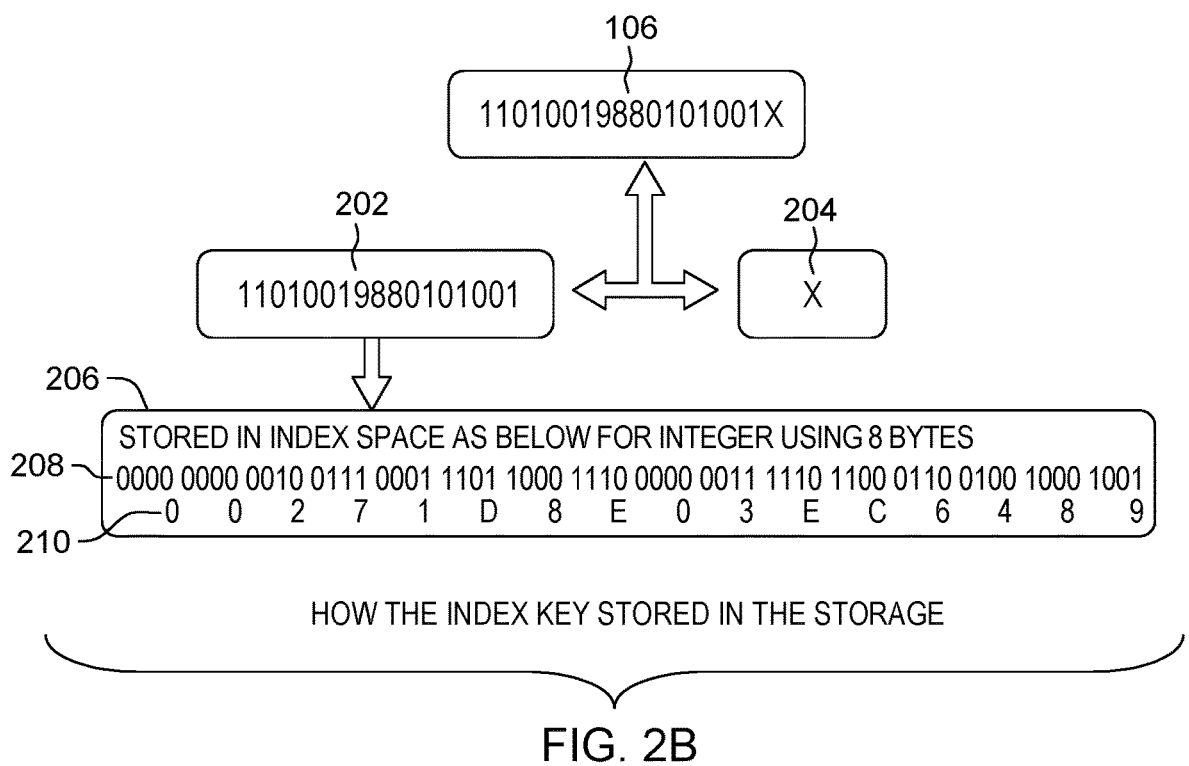

FIGS. 2A and 2B illustrate an example 200 of index key 106 with an example pattern of numeric digits and non-digit characters in index key 106, in accordance with an embodiment of the present disclosure.

In the example of FIGS. 2A and 2B, index key 106 is illustrated with "11010019880101001X". First part 202 of index key 106 is numeric digits as "11010019880101001". Second part 204 is a char "X". Index optimization module 104 may detect a pattern of index key 106 that includes first part 202 as numeric digits and second part as a char. Index key 106 requires 18 bytes of space because each numeric digit and non-digit character requires 1 byte of space. As illustrated in FIG. 2B, index optimization module 104 may convert first part 202 of numeric digits into integer 206. Integer 206 can be stored in an integral data type which requires 8 bytes. Integer 206 is illustrated in binary format 208 and hexadecimal format 210. Converted key 114 requires 9 bytes including 8 bytes for integer 208 and 1 byte for char "X". The total required space for converted key 114 is 9 bytes that is less than the original required space of 18 bytes for index key 106.

Figure 3A:
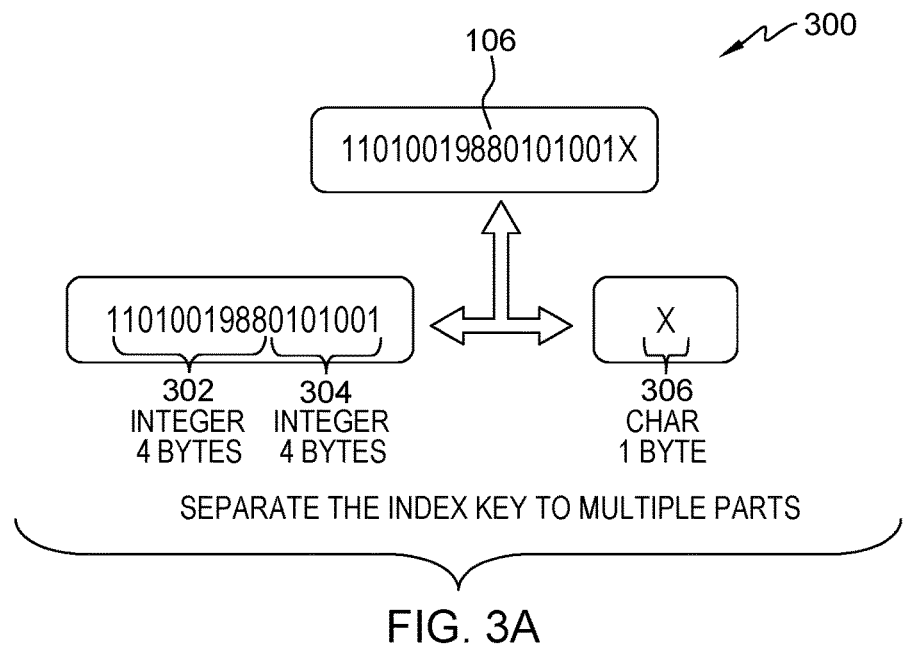
FIGS. 3A and 3B illustrate another example of the index key with another example pattern of numeric digits and non-digit characters in the index key of the computing device in FIG. 1, in accordance with an embodiment of the present disclosure.
Figure 3B:
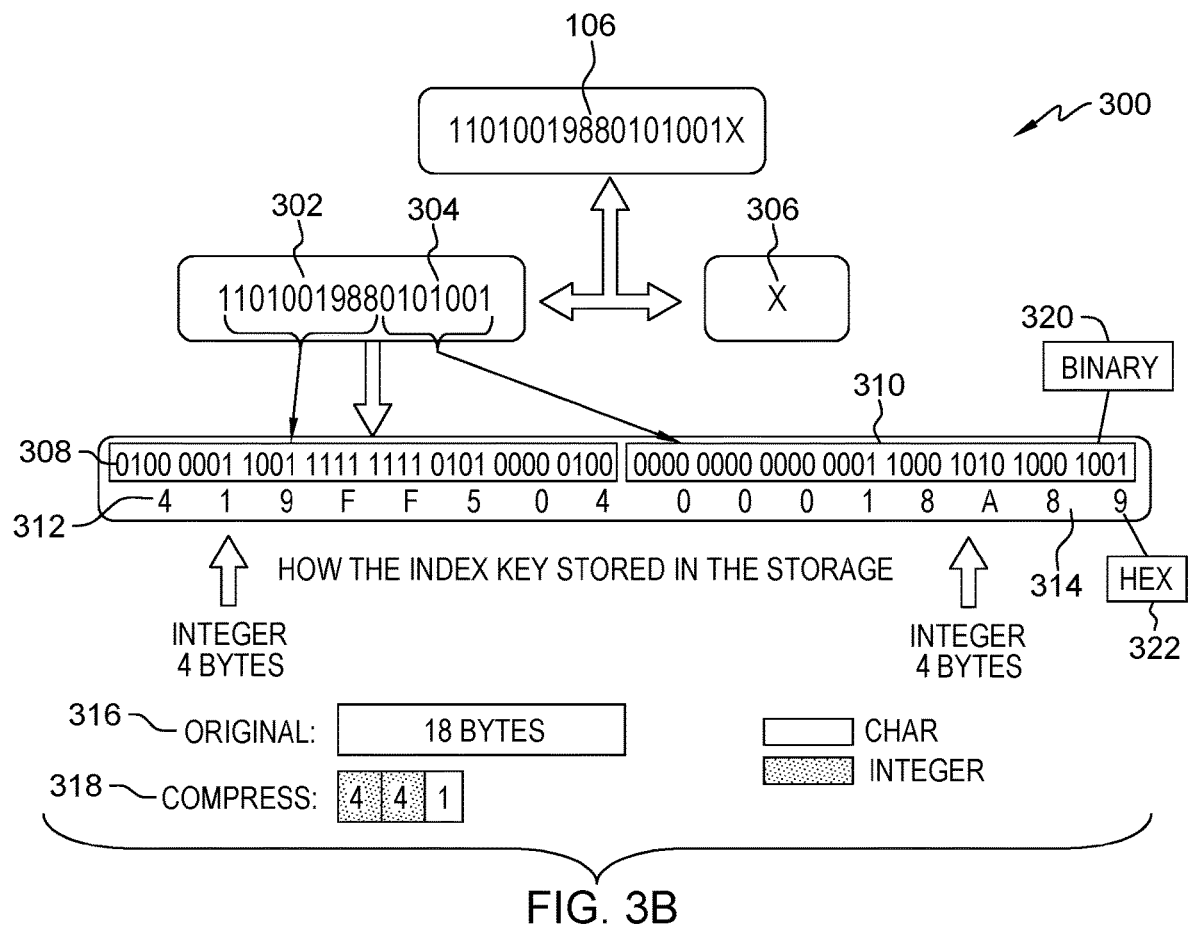

FIGS. 3A and 3B illustrate another example 300 of index key 106 with another example pattern of numeric digits and non-digit characters in index key 106, in accordance with an embodiment of the present disclosure.

In the example of FIGS. 3A and 3B, index key 106 is illustrated with "11010019880101001X". Index optimization module 104 may detect a pattern of index key 106 that includes numeric digits as "11010019880101001" and non-digit char 306 as "X". Index optimization module 104 may separate the numeric digits into two parts—first numeric digit part 302 and second numeric digit part 304. In an example, index key 106 requires 18 bytes of space because each numeric digit and non-digit character requires 1 byte of space. As illustrated in FIG. 3B, index optimization module 104 may convert the numeric digits into two integers which are shown as binary format 320 and hexadecimal format 322. First numeric digit part 302 is converted into first integer 312 in hexadecimal format 322 which requires 4 bytes of space. Second numeric digit part 304 is converted into second integer 314 in hexadecimal format 322 which requires 4 bytes of space. The corresponding binary values for first integer 312 and second integer 314 are shown in first integer binary part 308 and second integer binary part 310 respectively. Converted key 114 requires 9 bytes including 4 bytes for each of integers 312 and 314 and 1 byte for char "X" 306. Compressed space 318 for converted key 114 is 9 bytes that is less than original space 316 of 18 bytes for index key 106.

Figure 4:
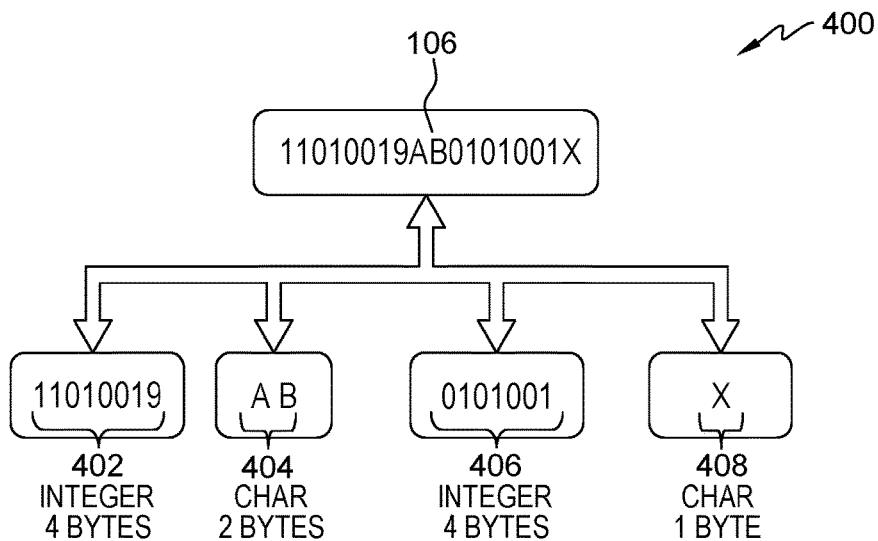
FIG. 4 illustrate another example of the index key with another example pattern of numeric digits and non-digit characters in the index key of the computing device in FIG. 1, in accordance with an embodiment of the present disclosure.

FIG. 4 illustrate another example 400 of index key 106 with another example pattern of numeric digits and non-digit characters in index key 106, in accordance with an embodiment of the present disclosure.

In the example of FIG. 4, index key 106 is illustrated as "11010019AB0101001X". Index optimization module 104 may detect a pattern of index key 106 that includes four parts. Part 402 and part 406 are numeric digits as "11010019" and "0101001". Part 404 and part 408 are non-digit chars as "AB" and "X". Index key 106 may require 18 bytes of space because each numeric digit and non-digit character requires 1 byte of space. Index optimization module 104 may convert the numeric digits of part 402 and part 406 into two integers respectively. Part 402 after conversion into an integer may require 4 bytes of space. Part 406 after conversion into an integer may require 4 bytes of space. Part 404 is still the char type which requires one byte of space for each char. Part 404 may require two bytes as part 404 has two chars "AB". Part 408 may require one byte as part 404 has one char "X". Accordingly, after conversion of index key 106, converted key 114 requires 11 bytes including 4 bytes for each integer of part 402 and part 404, 2 bytes for char "AB" of part 404, and 1 byte for char "X" of part 408. Compressed space for converted key 114 in the example is 11 bytes that is less than original space of 18 bytes for index key 106.

Figure 5:
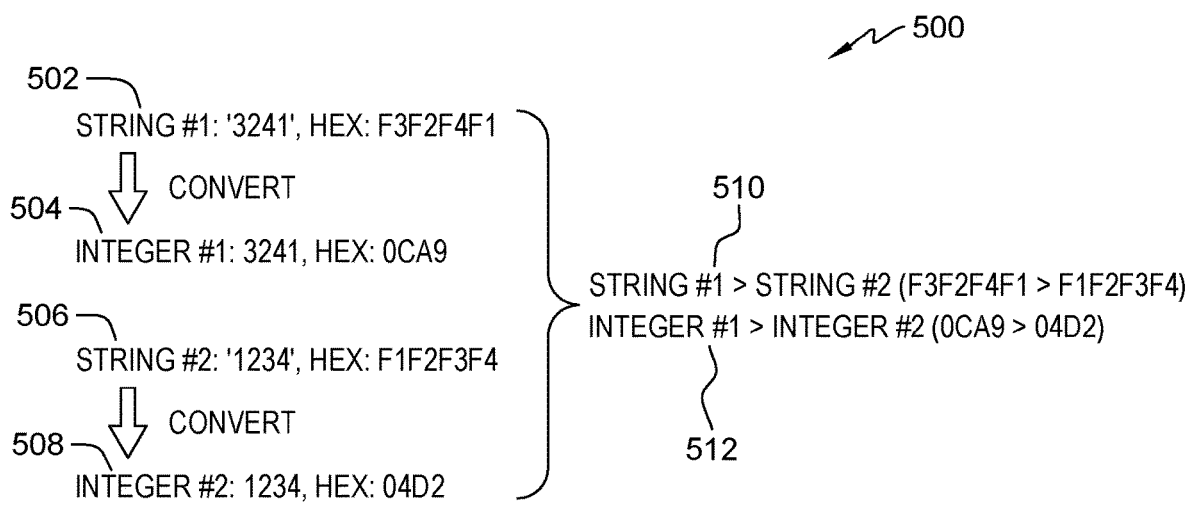
FIG. 5 illustrates an example for a function of access order preservation of an index optimization module for the index key of the computing device in FIG. 1, in accordance with an embodiment of the present disclosure.

FIG. 5 illustrates an example 500 for a function of access order preservation of index optimization module 104 for index key 106, in accordance with an embodiment of the present disclosure.

In the example of FIG. 5, two example index keys (I, II) 502, 506 are illustrated when they are used to search for database 110. Index key I 502 has a string "3241" which has a hexadecimal value of "F3F2F4F1" and requires 4 bytes of space. Index optimization module 104 may convert string "3241" into integer 3142. After conversion, index key I 502 becomes converted key I 504 with a hexadecimal value of "0CA5" which requires only 2 bytes of space. Index key II 506 has a string "1234" which has a hexadecimal value of "F1F2F3F4" and requires 4 bytes of space. Index optimization module 104 may convert string "1234" into integer 1234. After conversion, index key II 506 becomes converted key II 508 with a hexadecimal value of "04D2" which requires only 2 bytes of space. When index keys (I, II) 502, 506 are used to access database 110, the order to search database 110 is that index keys I 502 is greater than index keys I 502 because "F3F2F4F1" is greater than "F1F2F3F4". After conversion from index keys (I, II) 502, 506 into converted keys (I, II) 504, 508, the order to search and access database 110 with converted keys (I, II) 504, 508 is still same as the order with index keys (I, II) 502, 506. Converted key I 504 is greater than converted key II 508 as integer 3241 in the hexadecimal value of "0CA5" is also greater than integer 1234 in the hexadecimal value of "04D2". The search order of index keys (I, II) 502, 506 are preserved after index keys (I, II) 502, 506 are converted into converted keys (I, II) 504, 508 from the strings to the integers while saving the storage space.

Figure 6:
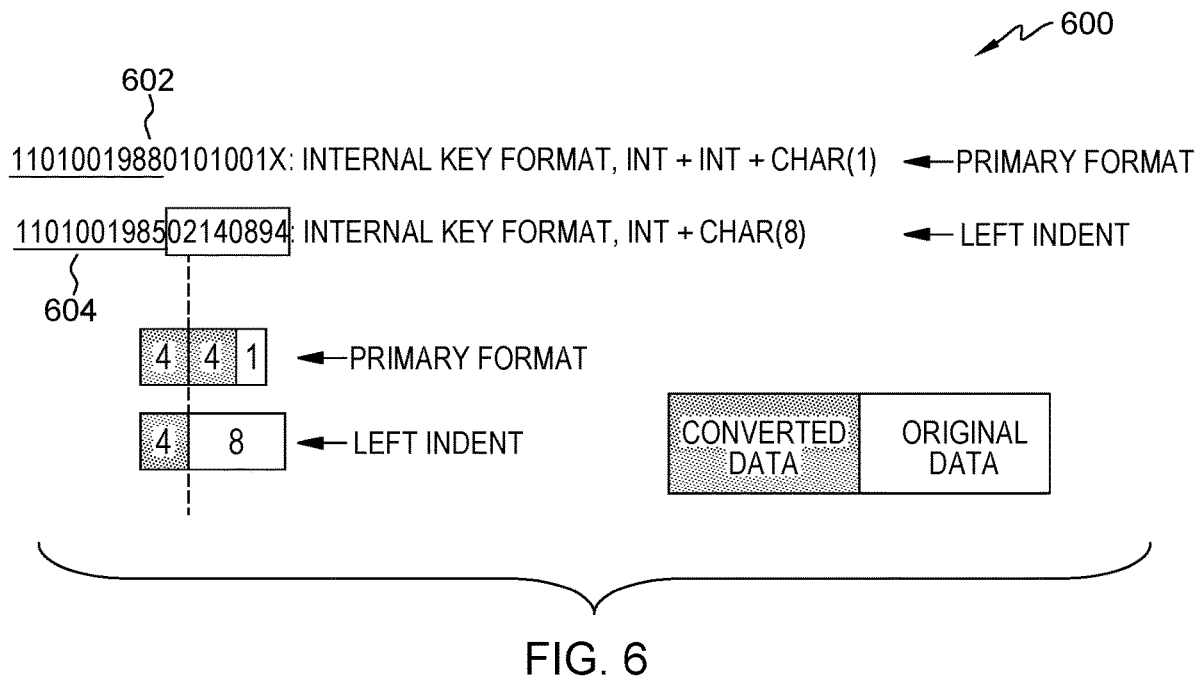
FIG. 6 illustrates an example of converting the index key back from an internal format to an external format in the index optimization module for the index key of the computing device in FIG. 1, in accordance with an embodiment of the present disclosure.

FIG. 6 illustrates an example 600 of converting an index key back from an internal format to an external format, in accordance with an embodiment of the present disclosure.

Index optimization module 104 may compare two or more converted keys 114 that are in different formats. Index optimization module 104 may convert one or more converted keys 114 back from an internal key format to another internal key format or an external key format to compare. An internal key format may mean a key format that has been used to convert index key 106 into converted key 114. An external key format may mean a key format that is originally from index key 106. In an example, there can be one internal key format for converting index key 106 into converted key 114. In another example, there can be multiple internal key formats for converting index key 106 into converted key 114. In the example of FIG. 6, example converted key 602 is converted with three parts: a first integer of "1101001988", a second integer of "0101001", and a char of "X". Example converted key 604 is converted with two parts: an integer of "1101001985" and a string of "02140894". When example converted key 602 and example converted key 604 are compared to access database 110, index optimization module 104 may compare the first part of example converted key 602 and example converted key 604 to determine the order in accessing to database 110. If the result of comparison is determined, index optimization module 104 may return the result without comparing the rest of the parts of example converted key 602 and example converted key 604. If index optimization module 104 is unable to determine the result of comparison based on the comparison of the first part of example converted key 602 and example converted key 604, index optimization module 104 may convert a part of an integer back to a part of char so the two converted keys 602, 604 can be in the same format to compare. For example, the second integer of "0101001" can be converted back to a string (char type) so both converted keys 602, 604 can be compared to determine the order of accessing database 110.

Figure 7:
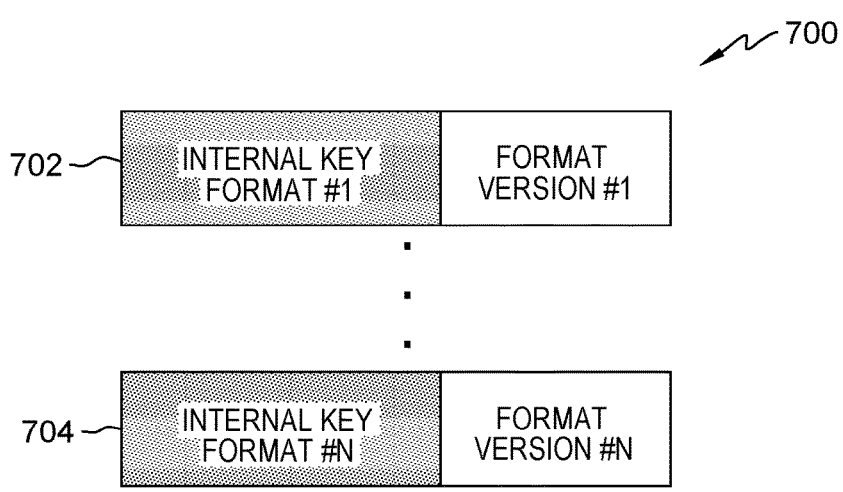
FIG. 7 illustrates an example of the index optimization module 104 building different internal formats after detecting patterns of the index key of the computing device in FIG. 1, in accordance with an embodiment of the present disclosure.

FIG. 7 illustrates an example of index optimization module 104 building different internal formats after detecting patterns of index key 106, in accordance with an embodiment of the present disclosure.

Index optimization module 104 may build multiple internal key formats 702, 704, according to newly detected patterns. Index optimization module 104 may compare index key 106 under different version of internal key formats 702, 704, as illustrated in FIG. 6 for different key format comparison.

Figure 8:
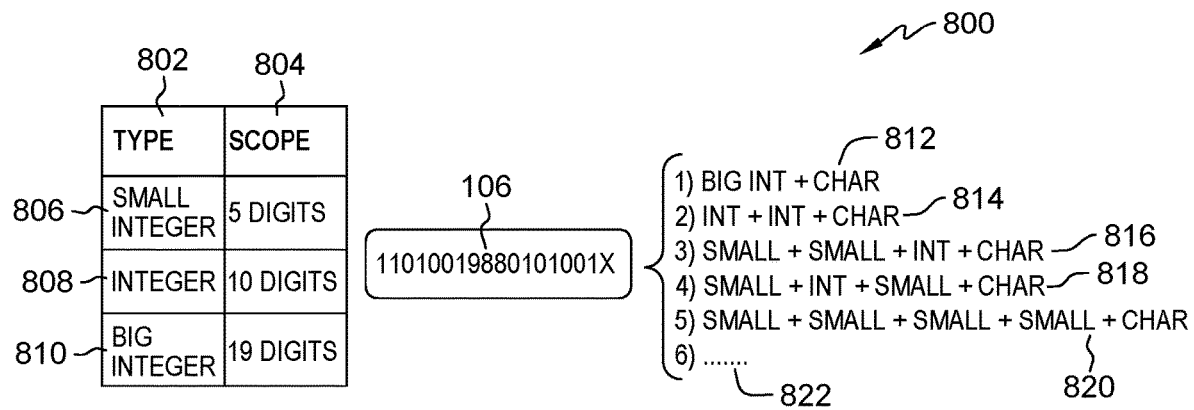
FIG. 8 illustrates an example of different integer data types allocation of the index optimization module using an example of the index key of the computing device in FIG. 1, in accordance with an embodiment of the present disclosure.

FIG. 8 illustrates an example 800 of different integer data types allocation of index optimization module 104 using an example of index key 106, in accordance with an embodiment of the present disclosure.

In the example of FIG. 8, index key 106 is illustrated with "11010019880101001X". In an example, integral data type 802 may include small integer type 806, integer type 808, and big integer type 810. Scope 804 for each integral data type 802 can be 5 digits, 10 digits, and 19 digits respectively. The difference between integral data type 802 is the size of the number that integral data type 802 can store. Small integer type 806 may require 2 bytes of storage per value. Small integer type 806 may store whole numbers that range, from example, from 0 to 65,535 for 5 digits of precision. Integer type 808 may require 4 bytes of storage per value. Integer type 808 may store whole numbers that range, for example, from 0 to 4,294,967,295 for 10 digits of precision. Big integer type 810 may require 8 bytes of storage per value. Big integer type 810 may store whole numbers that range, for example, from 0 to 18,446,744,073,709,551,615 for 19 digits of precision. Index optimization module 104 may dynamically divide index key 106 into multiple integers. Index optimization module 104 may select an integer type to convert accordingly based on different length comparisons for a cost difference of machine instructions. For example, index optimization module 104 may convert index key 106 into a big integer and a char 812. Index optimization module 104 may convert index key 106 into a first integer, a second integer and a char 814. Index optimization module 104 may convert index key 106 into a first small integer, a second small integer, an integer and a char 816. Index optimization module 104 may convert index key 106 into a first small integer, an integer, a second small integer and a char 818. Index optimization module 104 may convert index key 106 into a first small integer, a second small integer, a third small integer, a fourth small integer, and a char 820. Index optimization module 104 may convert index key 106 into a various combination 822 of different integer types 802.

Figure 9:
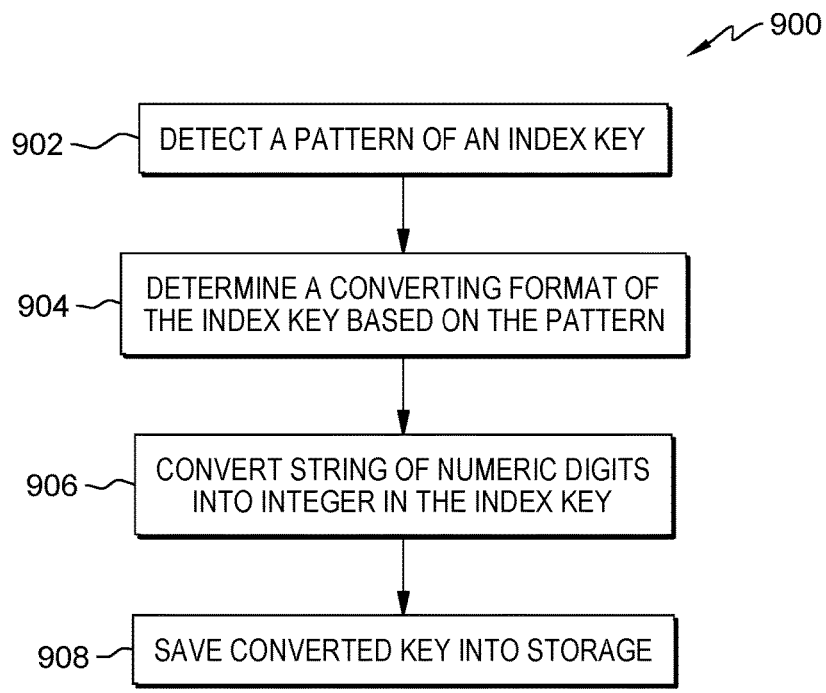
FIG. 9 is a flowchart depicting operational steps of the index optimization module within the computing device of FIG. 1, in accordance with an embodiment of the present disclosure.

FIG. 9 is a flowchart 900 depicting operational steps of index optimization module 104 in accordance with an embodiment of the present disclosure.

Index optimization module 104 operates to detect a pattern of index key 106. Index optimization module 104 also operates to determine a converting format of index key 106 based on the pattern of index key 106. Index optimization module 104 operates to convert a string of numeric digits into an integer in index key 106. Index optimization module 104 operates to save converted key 114 into storage 112.

In step 902, index optimization module 104 detects a pattern of index key 106. The pattern of index key 106 may include how many numeric digits and how many non-digit characters are in index key 106. The pattern of index key 106 may also include how the numeric digits and the non-digit characters are positioned in index key 106. In an example, the numeric digits can be all positioned together in index key 106. In another example, the non-digit characters can be all positioned together in index key 106. In another example, the numeric digits can be positioned in multiple portions of index key 106. In yet another example, the non-digit characters can be positioned in multiple portions of index key 106.

In step 904, index optimization module 104 determines a converting format of index key 106 based on the pattern of index key 106. A converting format means a format that index optimization module 104 may convert the numeric digits from a char type into an integral data type based on the pattern of index key 106. An integer is a number that can be written without a fractional component. Generally, an integer may be a datum of integral data type that represents some range of mathematical integers. Integral data types may be of different sizes and may or may not be allowed to contain negative values. Integers may be commonly represented as a group of binary digits (bits). In an example, an integral data type may store whole numbers that range, for example, from 0 to 4,294,967,295 for 10 digits of precision. An integral data type may require 4 bytes of storage per value. A byte generally means eight bits. In another example, an integral data type may be a small integer type, an integer type, or a big integer type. The difference between these types is the size of the number that they can store. In an example, a small integer type may require 2 bytes of storage per value. The small integer type may store whole numbers that range, from example, from 0 to 65,535 for 5 digits of precision. An integer type may require 4 bytes of storage per value. The integer type may store whole numbers that range, for example, from 0 to 4,294,967,295 for 10 digits of precision. A big integer type may require 8 bytes of storage per value. The big integer type may store whole numbers that range, for example, from 0 to 18,446,744,073,709,551, 615 for 20 digits of precision. An integral data type can be in other suitable format to hold integers.

In step 906, index optimization module 104 converts a string of numeric digits into an integer in index key 106. As discussed above, each numeric digit in index key 106 may require one byte of space as index key 106 is defined as a char type. An integer type may require 4 bytes of storage per value. The integer type may store whole numbers that range, for example, from 0 to 4,294,967,295 for 10 digits of precision. In an example, if index key 106 includes two portions—a first portion is numeric digits and a second portion is non-digit characters, index optimization module 104 may convert the numeric digits of the entire first portion into an integral data type as one integer. Index optimization module 104 may keep the second portion of non-digit characters as the same as a char type. Alternatively, index optimization module 104 may convert the numeric digits of the entire first portion as multiple integers. In another example, if index key 106 includes multiple portions of numeric digits, index optimization module 104 may convert each portion of the numeric digits into an integral data type as an integer for each portion. The integral data type can be a small integer type, an integer type, a big integer type, or other suitable integer types. The difference between these integral data types is the size of the number that they can store. In an example, a small integer type may require 2 bytes of storage that can store whole numbers that range from 0 to 65,535. An integer type may require 4 bytes of storage that can store whole numbers that range from 0 to 4,294,967,295. A big integer type may require 8 bytes of storage that may store whole numbers that range from 0 to 18,446,744,073,709,551,615. Converting numeric digits into integers in index key 106 is depicted with some examples and described in further detail with respect to FIGS. 2-6.

In step 908, index optimization module 104 saves converted key 114 into storage 112. Converted key 114 may include integers that have been converted from numeric digits in index key 106. Converted key 114 may also include non-digit characters in index key 106. Because an integer would generally require less space than a string of numeric digits, converted key 114 would need less space than index key 106. In addition, after index key 106 is converted into converted key 114, the order of index is kept as the same in index key 106 and converted key 114. Index optimization module 104 may preserve the order of index access to database 110 after index key 106 is converted into converted key 114. The order of index is kept as the same in index key 106 and converted key 114. There is no need for additional transformation for a key comparison.

Figure 10:
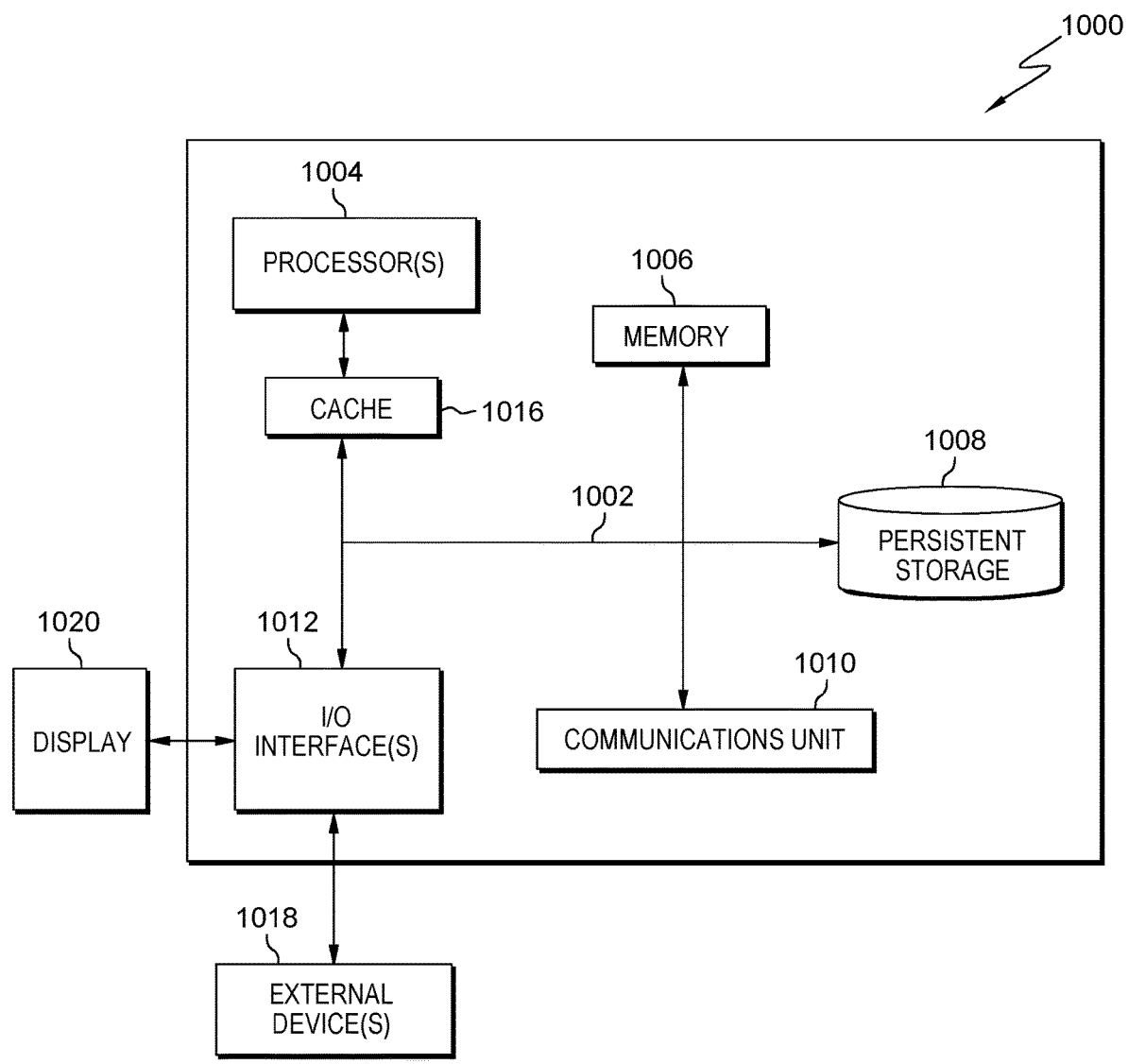
FIG. 10 is a block diagram of components of the computing device of FIG. 1, in accordance with an embodiment of the present disclosure.

FIG. 10 depicts a block diagram 1000 of components of computing device 102 in accordance with an illustrative embodiment of the present disclosure. It should be appreciated that FIG. 10 provides only an illustration of one implementation and does not imply any limitations with regard to the environments in which different embodiments may be implemented. Many modifications to the depicted environment may be made.

Computing device 102 may include communications fabric 1002, which provides communications between cache 1016, memory 1006, persistent storage 1008, communications unit 1010, and input/output (I/O) interface(s) 1012. Communications fabric 1002 can be implemented with any architecture designed for passing data and/or control information between processors (such as microprocessors, communications and network processors, etc.), system memory, peripheral devices, and any other hardware components within a system. For example, communications fabric 1002 can be implemented with one or more buses or a crossbar switch.

Memory 1006 and persistent storage 1008 are computer readable storage media. In this embodiment, memory 1006 includes random access memory (RAM). In general, memory 1006 can include any suitable volatile or non-volatile computer readable storage media. Cache 1016 is a fast memory that enhances the performance of computer processor(s) 1004 by holding recently accessed data, and data near accessed data, from memory 1006.

Index optimization module 104 may be stored in persistent storage 1008 and in memory 1006 for execution by one or more of the respective computer processors 1004 via cache 1016. In an embodiment, persistent storage 1008 includes a magnetic hard disk drive. Alternatively, or in addition to a magnetic hard disk drive, persistent storage 1008 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 1008 may also be removable. For example, a removable hard drive may be used for persistent storage 1008. Other examples include optical and magnetic disks, thumb drives, and smart cards that are inserted into a drive for transfer onto another computer readable storage medium that is also part of persistent storage 1008.

Communications unit 1010, in these examples, provides for communications with other data processing systems or devices. In these examples, communications unit 1010 includes one or more network interface cards. Communications unit 1010 may provide communications through the use of either or both physical and wireless communications links. Index optimization module 104 may be downloaded to persistent storage 1008 through communications unit 1010.

I/O interface(s) 1012 allows for input and output of data with other devices that may be connected to computing device 102. For example, I/O interface 1012 may provide a connection to external devices 1018 such as a keyboard, keypad, a touch screen, and/or some other suitable input device. External devices 1018 can also include portable computer readable storage media such as, for example, thumb drives, portable optical or magnetic disks, and memory cards. Software and data used to practice embodiments of the present invention, e.g., index optimization module 104 can be stored on such portable computer readable storage media and can be loaded onto persistent storage 1008 via I/O interface(s) 1012. I/O interface(s) 1012 also connect to display 1020.

Display 1020 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
   detecting, by one or more processors, a pattern of characters and numeric digits of an index key, the index key providing an access to a database through an index access without a sorting operation;

determining, by one or more processors, a converting format based on the pattern of the index key, the pattern including a string of the numeric digits, the converting format being a format to convert the numeric digits from a char type into an integral data type based on the pattern of the index key, wherein the pattern includes multiple strings of numeric digits and one or more non-digit characters in different positions of the index key;

converting, by one or more processors, the index key into a converted key by converting the string of the numeric digits into an integer, wherein converting the index key into the converted key includes converting the multiple strings of numeric digits into multiple integers;

saving, by one or more processors, the converted key into a storage;

detecting, by one or more processors, a pattern of a second index key;

determining, by one or more processors, a converting format based on the pattern of the second index key;

converting, by one or more processors, the second index key into a second converted key; and saving, by one or more processors, the second converted key into the storage, wherein an order of the index access to search and access the database is preserved and kept the same for the converted key and the second converted key as for the index key and the second index key, wherein the two converted keys require less storage than the index key and the second index key prior to conversion while preserving the search order of the two index keys to access the database.

2. The computer-implemented method of claim 1, wherein the integer is a data type in a hexadecimal format.

3. The computer-implemented method of claim 1, wherein the integer requires less space than the string of numeric digits as a char data type.

4. A computer program product comprising:
one or more computer readable storage media, and program instructions collectively stored on the one or more computer readable storage media, the program instructions comprising:
program instructions to detect a pattern of characters and numeric digits of an index key, the index key providing an access to a database through an index access without a sorting operation;
program instructions to determine a converting format based on the pattern of the index key, the pattern including a string of the numeric digits, the converting format being a format to convert the numeric digits from a char type into an integral data type based on the pattern of the index key, wherein the pattern includes multiple strings of numeric digits and one or more non-digit characters in different positions of the index key;
program instructions to convert the index key into a converted key by converting the string of the numeric digits into an integer, wherein program instructions to convert the index key into the converted key include program instructions to convert the multiple strings of numeric digits into multiple integers;
program instructions to save the converted key into a storage;
program instructions to detect a pattern of a second index key;
program instructions to determine a converting format based on the pattern of the second index key;
program instructions to convert the second index key into a second converted key; and
program instructions to save the second converted key into the storage, wherein an order of the index access to search and access the database is preserved and kept the same for the converted key and the second converted key as for the index key and the second index key, wherein the two converted keys require less storage than the index key and the second index key prior to conversion while preserving the search order of the two index keys to access the database.

5. The computer program product of claim 4, wherein the integer is a data type in a hexadecimal format.

6. The computer program product of claim 4, wherein the integer requires less space than the string of numeric digits as a char data type.

7. A computer system comprising:
one or more computer processors, one or more computer readable storage media, and program instructions stored on the one or more computer readable storage media for execution by at least one of the one or more computer processors, the program instructions comprising:
one or more computer readable storage media, and program instructions collectively stored on the one or more computer readable storage media, the program instructions comprising:
program instructions to detect a pattern of characters and numeric digits of an index key, the index key providing an access to a database through an index access without a sorting operation;
program instructions to determine a converting format based on the pattern of the index key, the pattern including a string of the numeric digits, the converting format being a format to convert the numeric digits from a char type into an integral data type based on the pattern of the index key, wherein the pattern includes multiple strings of numeric digits and one or more non-digit characters in different positions of the index key;
program instructions to convert the index key into a converted key by converting the string of the numeric digits into an integer, wherein program instructions to convert the index key into the converted key include program instructions to convert the multiple strings of numeric digits into multiple integers;
program instructions to save the converted key into a storage;
program instructions to detect a pattern of a second index key;
program instructions to determine a converting format based on the pattern of the second index key;
program instructions to convert the second index key into a second converted key; and
program instructions to save the second converted key into the storage, wherein an order of the index access to search and access the database is preserved and kept the same for the converted key and the second converted key as for the index key and the second index key, wherein the two converted keys require less storage than the index key and the second index key prior to conversion while preserving the search order of the two index keys to access the database.

8. The computer system of claim 7, wherein the integer is a data type in a hexadecimal format.

9. The computer system of claim 7, wherein the integer requires less space than the string of numeric digits as a char data type.

* * * * *